United States Patent
Nakagawa et al.

(10) Patent No.: US 11,360,690 B2
(45) Date of Patent: Jun. 14, 2022

(54) STORAGE DEVICE AND METHOD FOR ERASING DATA OF STORAGE DEVICE

(71) Applicant: HITACHI, LTD., Tokyo (JP)

(72) Inventors: Hirotaka Nakagawa, Tokyo (JP); Akihiro Hara, Tokyo (JP)

(73) Assignee: HITACHI, LTD., Tokyo (JP)

(*) Notice: Subject to any disclaimer, the term of this patent is extended or adjusted under 35 U.S.C. 154(b) by 74 days.

(21) Appl. No.: 16/549,721

(22) Filed: Aug. 23, 2019

(65) Prior Publication Data

US 2020/0285412 A1 Sep. 10, 2020

(30) Foreign Application Priority Data

Mar. 6, 2019 (JP) .............................. JP2019-040775

(51) Int. Cl.
*G06F 3/06* (2006.01)
*G06F 9/455* (2018.01)

(52) U.S. Cl.
CPC ............ *G06F 3/0652* (2013.01); *G06F 3/067* (2013.01); *G06F 3/0608* (2013.01); *G06F 3/0659* (2013.01); *G06F 9/45558* (2013.01); *G06F 2009/45583* (2013.01); *G06F 2009/45595* (2013.01)

(58) Field of Classification Search
CPC .... G06F 3/0652; G06F 3/0608; G06F 3/0659; G06F 3/067; G06F 9/45558; G06F 2009/45583; G06F 2009/45595
See application file for complete search history.

(56) References Cited

U.S. PATENT DOCUMENTS

| | | | |
|---|---|---|---|
| 8,639,669 B1* | 1/2014 | Douglis | G06F 3/061 707/692 |
| 9,454,321 B1* | 9/2016 | Smaldone | G06F 3/061 |
| 10,048,885 B1* | 8/2018 | Bono | G06F 3/067 |
| 10,141,060 B1* | 11/2018 | Iwai | G11C 16/16 |
| 10,459,632 B1* | 10/2019 | Chen | G06F 3/0619 |
| 10,613,755 B1* | 4/2020 | Sela | G06F 3/067 |
| 10,628,379 B1* | 4/2020 | Sela | G06F 11/2074 |
| 2006/0117153 A1* | 6/2006 | Tran | G06F 21/6218 711/159 |
| 2009/0100212 A1* | 4/2009 | Boyd | G06F 3/0613 711/5 |
| 2012/0079289 A1* | 3/2012 | Weng | G06F 12/0246 713/193 |
| 2012/0173795 A1* | 7/2012 | Schuette | G06F 12/0246 711/103 |
| 2012/0198188 A1* | 8/2012 | Coronado | G06F 16/23 711/E12.103 |
| 2012/0278564 A1* | 11/2012 | Goss | G06F 12/00 711/155 |

(Continued)

FOREIGN PATENT DOCUMENTS

JP 2013-246582 A 12/2013

*Primary Examiner* — Prasith Thammavong
(74) *Attorney, Agent, or Firm* — Baker Botts L.L.P.

(57) ABSTRACT

There is provided a storage device that is connected to a computer and receives an UNMAP command to cancel a relationship between a logical address and a physical address provided to the computer, in response to data deletion on the computer. The storage device includes a control unit configured to make data stored in a physical address specified by the UNMAP command irreversible.

15 Claims, 17 Drawing Sheets

(56) References Cited

U.S. PATENT DOCUMENTS

| | | | |
|---|---|---|---|
| 2013/0124785 A1* | 5/2013 | Xiong | G06F 21/6245 |
| | | | 711/103 |
| 2013/0191636 A1* | 7/2013 | Aramaki | G06F 21/44 |
| | | | 713/168 |
| 2013/0318316 A1 | 11/2013 | Yamada | |
| 2016/0246529 A1* | 8/2016 | Kim | G11C 16/16 |
| 2017/0075620 A1* | 3/2017 | Yamamoto | G06F 12/0871 |
| 2017/0161202 A1* | 6/2017 | Erez | G06F 3/06 |
| 2018/0005700 A1* | 1/2018 | Kang | G11C 11/5635 |
| 2019/0121579 A1* | 4/2019 | Kim | G06F 3/0679 |
| 2019/0187925 A1* | 6/2019 | Urata | G06F 3/0673 |
| 2019/0205052 A1* | 7/2019 | Harris | G06F 3/0604 |
| 2019/0370079 A1* | 12/2019 | Ramesh | G06F 3/061 |
| 2020/0027512 A1* | 1/2020 | Yun | G11C 16/107 |
| 2020/0201785 A1* | 6/2020 | Hanna | G06F 11/1004 |

\* cited by examiner

FIG. 5A

VM MANAGEMENT TBL. T100

| VM ID | DS ID | FILE PATH |
|---|---|---|
| VM01 | DS1 | /DS1/VM001/VM001.vmdk |
|  |  | /DS1/VM001/VM001.vmx |
|  |  | /DS1/VM001/VM001.vmsd |
|  |  | /DS1/VM001/VM001.vmxf |
|  |  | /DS1/VM001/VM001-0.vmdk |
| VM02 | DS2 | /DS2/VM002/VM002.vmdk |
|  |  | /DS2/VM002/VM002.vmx |
|  |  | /DS2/VM002/VM002.vmsd |
|  |  | /DS2/VM002/VM002.vmxf |

STORAGE MANAGEMENT TBL. T200

| DS/VOL ID | TYPE | LU ID |
|---|---|---|
| DS1 | EXTERNAL | Storage1. LU01 |
| DS2 | EXTERNAL | Storage1. LU02 |
| VOL001 | RDM | Stoarge1. LU03 |

LU MANAGEMENT TBL. T300

| LU ID (T301) | CAPACITY (T302) | POOL ID (T303) | PORT ID (T304) |
|---|---|---|---|
| 01 | 3TB | POOL1 | 1-A |
| 02 | 2TB | POOL1 | 2-A |
| 03 | 4TB | POOL1 | 2-A |

FIG. 6B

POOL MANAGEMENT TBL. T400

| POOL ID (T401) | CAPACITY (T402) | FREE CAPACITY (T403) | PARITY GROUP ID (T404) | DEDUP (T405) |
|---|---|---|---|---|
| POOL1 | 100TB | 91TB | PG001 PG002 | ON |

FIG. 7

PG MANAGEMENT TBL. T500

| PG ID (T501) | RAID INFO (T502) | DISK INFO (T503) | CAPACITY (T504) |
|---|---|---|---|
| PG001 | RAID5 (4D+1P) | DISK000<br>DISK001<br>DISK002<br>DISK003<br>DISK004 | 50TB |
| PG002 | RAID5 (4D+1P) | DISK010<br>DISK011<br>DISK012<br>DISK003<br>DISK014 | 50TB |

FIG. 8

POOL MANAGEMENT TBL. T600a

| PAGE ID (T601a) | POOL LBA (T602a) | LU ID (T603a) | LU LBA (T604a) |
|---|---|---|---|
| 0x00 | 0x0000000 | LU01 | 0x000000 |
| 0x01 | 0x000002A | LU01 | 0x0002A0 |
|  |  | LU02 | 0x000540 |
| 0x02 | 0x0000054 | LU02 | 0x000000 |
| ... | ... | ... | ... |
| 0x61 | 0x63FFEA0 |  |  |

FIG. 13

POOL MANAGEMENT TBL. T600b

| PAGE ID | POOL LBA | LU ID | LU LBA |
|---|---|---|---|
| 0x00 | 0x00000000 | | |
| 0x01 | 0x0000002A | | |
| 0x02 | 0x00000054 | LU02 | 0x0000000 |
| 0x03 | 0x0000007E | LU02 | 0x0000540 |
| ... | ... | ... | ... |
| 0x61 | 0x63FFFEA0 | | |

T6010b  T6020b  T6030b  T6040b

STORAGE DEVICE AND METHOD FOR ERASING DATA OF STORAGE DEVICE

CLAIM OF PRIORITY

The present application claims priority to Japanese Patent Application No. 2019-040775 filed on Mar. 6, 2019, the content of which is hereby incorporated by reference into this application.

BACKGROUND OF THE INVENTION

1. Field of the Invention

The present invention relates to a storage device and a method for erasing data of the storage device.

2. Description of the Related Art

In a storage device having a thin provisioning function that improves capacity efficiency, it is aimed to further improve the capacity efficiency by a deduplication function to make a plurality of pages refer to one page in duplicate when stored data between partial storage areas (pages) in a thin provisioning pool matches.

Further, a configuration is used in which a plurality of virtual machines (VM) are constructed on one physical host computer by a virtualization technology on a host computer, and data used by a VM image and an application on a VM is stored in a logical volume in a storage device.

When the logical volume based on the thin provisioning function of the storage device is used as a storage destination of data used by the VM image or the application on the VM, data deletion on a file system on the host computer is not propagated to the storage device. Therefore, JP-A-2013-246582 (Patent Literature 1) discloses a technology in which a host computer specifies release of a data deletion area to a storage device with a SCSI UNMAP command defined by SCSI T10 so as to releases a physical area for the specified area.

According to the technology of Patent Literature 1, although a data storage area can be released to a storage device having a thin provisioning function by using a SCSI UNMAP command, data remains in a target physical area of the area. Erasing the data remaining in the target physical area is not mentioned in Patent Literature 1.

Meanwhile, recently, a legal regulation requires complete erasing of data used by an image or an application of a VM. For example, an example of the legal regulation includes a security-related guideline "NISI SP 800" established to secure security required for companies developing and manufacturing products and technologies procured by US government agencies. The SCSI UNMAP command disclosed in Patent Literature 1 executes release of the data storage area, but is not mentioned about erasing the stored data and is not considered to satisfy the above-mentioned legal regulation.

Further, when performing data complete erasing in accordance with the legal regulation on a host computer, a load on the host computer may be huge since it is necessary to overwrite random data a specified number of times on a target storage data area on a file system.

Furthermore, writing of random data reduces a data duplication rate of a partial logical storage area on a thin provisioning Pool, which may lead to a decrease in capacity utilization efficiency.

SUMMARY OF THE INVENTION

Therefore, an object of the invention is to provide a storage device and a method for erasing data of the storage device, which reduces a resource load on a host computer related to data erasing processing and erases data of the storage device.

In addition, another object of the invention is to provide a storage device and a data erasing method in which data is erased with a decrease in a deduplication rate of the storage device having a deduplication function being prevented.

In order to solve the above problems, a preferred example of a storage device of the invention is a storage device that is connected to a computer and receives an UNMAP command to cancel a relationship between a logical address and a physical address provided to the computer in response to data deletion on the computer. The storage device includes a control unit configured to make data stored in a physical address specified by the UNMAP command irreversible.

Further, a preferred example of a storage device of the invention is a storage device that is connected to a computer and receives an UNMAP command to cancel a relationship between a logical address and a physical address provided to the computer in response to data deletion on the computer. The storage device includes a control unit configured to: determine whether data stored in a physical page specified by the UNMAP command is allocated to a plurality of logical volumes, duplicate the data in the physical page to a different physical page when the data stored in the physical page is allocated to the plurality of logical volumes, and allocate the different physical page to which the data is duplicated to a second logical volume other than a first logical volume specified by the UNMAP command.

According to the disclosed technology, a resource load on a host computer related to data erasing processing can be reduced and data of a storage device can be erased.

In addition, according to the disclosed technology, it is possible to perform data erasing with a reduction in a deduplication rate of a storage device having a deduplication function being prevented.

BRIEF DESCRIPTION OF THE DRAWINGS

FIG. 5A shows an example of a virtual machine management table contained in a Hypervisor on the host computer.

FIG. 5B shows an example of a storage management table contained in the Hypervisor on the host computer.

FIG. 6A shows an example of an LU management table provided in the storage device.

FIG. 6B shows an example of a pool management table provided in the storage device.

FIG. 7 shows an example of a parity group management table provided in the storage device.

FIG. 8 shows an example of a pool management table that manages page allocation information (metadata) of a thin provisioning Pool provided in the storage device.

FIG. 13 shows a configuration example of metadata after the data erasing processing of the storage configuration control program.

DESCRIPTION OF EMBODIMENTS

Embodiments of the invention will be described below with reference to the drawings.

In the following description, information of each embodiment is described in an expression "table", but these pieces of information do not necessarily need to be described in a table, and may be described in data structures other than the table. In addition, an operation may be described with a "program" as a subject, but a processor can also be a subject since the program performs specified processing using a memory or the like by the processor.

Processing of executing a program by a processor may be realized partially or entirely by dedicated hardware. In the present specification, the processing of executing a program by a processor will be described using an expression "-unit", but some or all of these "-units" may be used for execution of a program by a processor, or some or all of these "-units" may be dedicated hardware.

Further, a program may be installed by a program distribution server or a storage medium readable by a computer.

Further, in the following description, when an alphabet at an end of a symbol is omitted, the symbol represents a generic name for an object thereof.

First Embodiment

In a first embodiment, it is assumed that a storage device has a thin provisioning function and a deduplication function, and corresponds to a SCSI UNMAP command. A host computer provides a virtual machine (hereinafter, referred to as VM) by a Hypervisor, and stores an image file of the VM in a data store formed of a logical volume (hereinafter referred to as LU) provided by the storage device. Under such an environment, processing of the storage device erasing data from a physical storage unit corresponding to the LU is shown.

Figure 1:
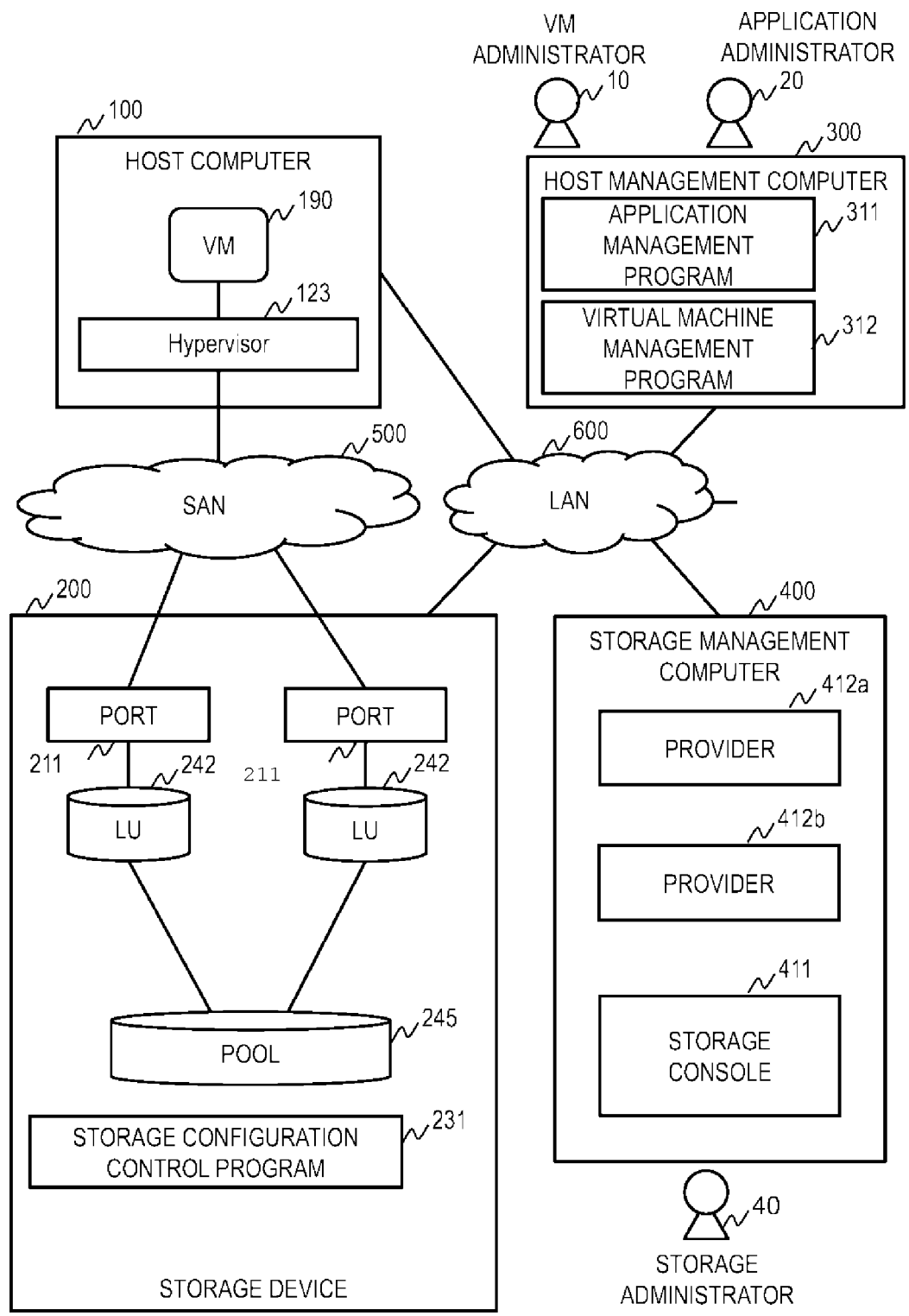
FIG. 1 shows an overall configuration example of a system according to a first embodiment.

FIG. 1 shows a configuration example of a system according to the first embodiment.

A host computer 100 and a storage device 200 are connected via a network (hereinafter referred to as SAN) 500 constituted by a Storage Area Network (SAN), iSCSI, or the like. The host computer 100 can be referred to as a computer that issues an IO request to the storage device 200.

The storage device 200 provides the host computer 100 with a logical volume (LU: referred to as Logical Unit) 242 as a data storage area.

The LU 242 allocated to the host computer 100 is taken as a data store in a Hypervisor 123 provided in the host computer 100, and is used as storage of image data of a VM 190 or a data storage area of an OS or an application on the VM 190. The host computer 100 and a host management computer 300 are connected via a management network 600 constituted by a Local Area Network (LAN).

A VM administrator 10 and an application administrator 20 manage the host computer 100, the VM 190 on the computer 100, the OS on the VM 190, and the application on the OS using an application management program 311 and a virtual machine management program 312 provided in the host management computer 300.

Providers 412a and 412b provided in a storage management computer 400 provide an API used for performing a storage resource operation in accordance with a format and a schema defined by the application management program 311 and the virtual machine management program 312. The application management program 311, the virtual machine management program 312, and the Hypervisor 123 transmit a storage resource operation request to the API provided by the provider 412 via the management network 600. When receiving the storage resource operation request, the providers 412a and 412b transmit a requested storage resource operation to a storage configuration control program 231 provided in the storage device 200. The storage configuration control program 231 executes request processing.

Further, the storage management computer 400 includes a storage console 411 that provides a Graphical User Interface (GUI) and a Command Line Interface (CLI) for the storage resource operation. A storage administrator 40 instructs the storage configuration control program 231 to perform the storage resource operation and a device maintenance operation through the management network 600 via the storage console 411.

Hereinafter, internal configurations of the storage device 200, the host computer 100 and the management computers 300 and 400 will be described using FIG. 2, FIG. 3 and FIG. 4, respectively.

Figure 2:
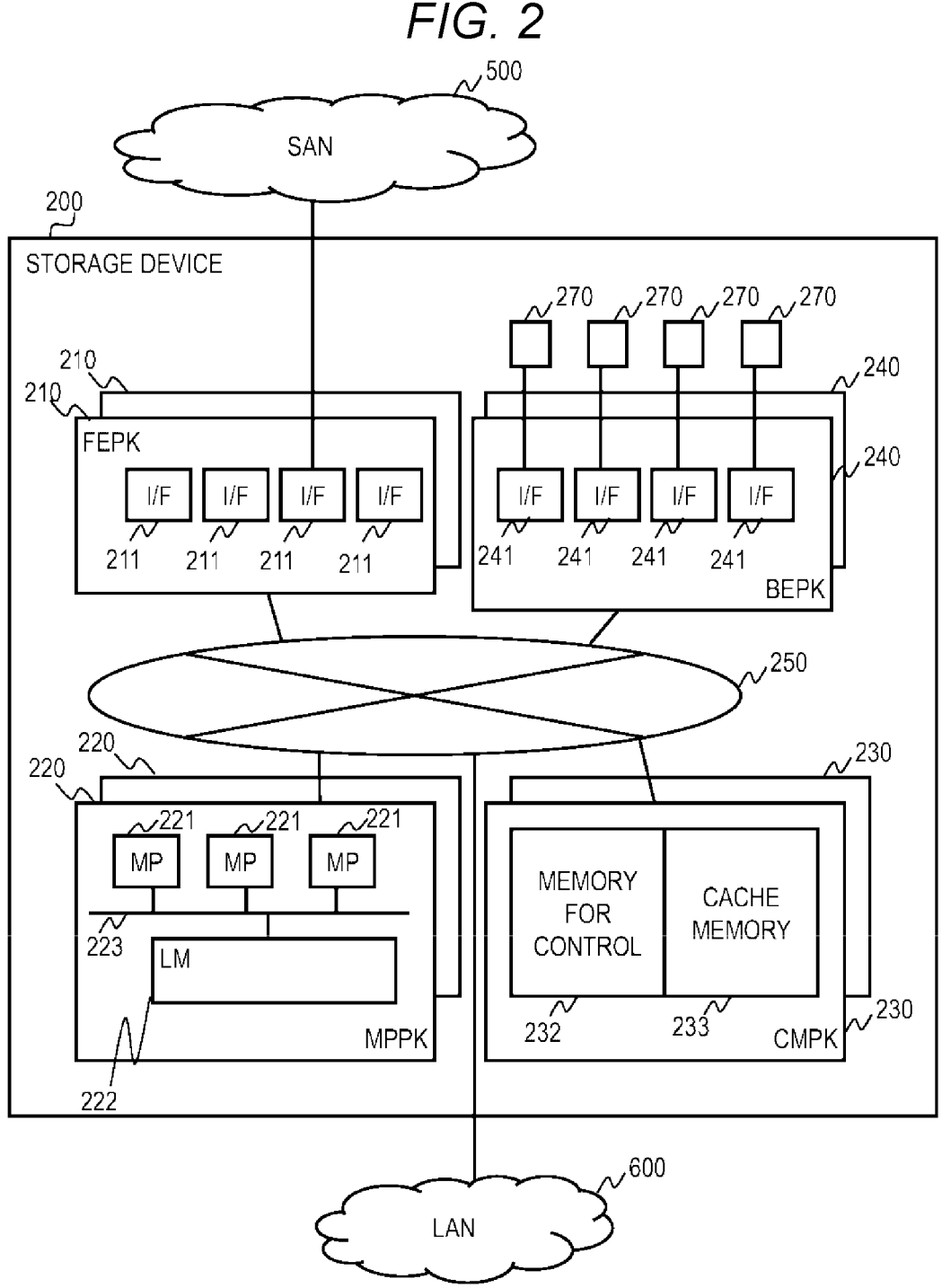
FIG. 2 shows a configuration example of a storage device according to the first embodiment.

FIG. 2 shows a configuration example of the storage device according to the first embodiment. As shown in FIG. 2, the storage device 200 includes one or more Front End PacKages (FEPK) 210 which are Host I/F units, one or more Micro Processor PacKages (MPPK) 220 which are storage control units, one or more Cache Memory PacKages (CMPK) 230 which are shared memory units, one or more BackEnd PacKages (BEPK) 240 which are disk I/F units, and one or more Hard Disk Drives (HDD) 270 as an example of the storage device. In addition to an HDD such as a SATA drive or a SAS drive, various types of drives such as a solid state drive (SDD) can be used as the storage device.

An internal network 250 connects the FEPK 210, the MPPK 220, the CMPK 230, and the BEPK 240 to each other. Each MP 221 of the MPPK 220 can communicate with any one of the FEPK 210, the CMPK 230, and the BEPK 240 by the internal network 250. The FEPK 210 includes a plurality of logical ports 211 each serving as a host I/F.

The BEPK 240 includes a plurality of disk I/Fs 241. The disk I/F 241 is connected to a drive 270 via, for example, a cable, and is connected to the internal network 250. The BEPK 240 mediates processing of delivering data to be read or written between an internal network 250 side and an HDD 270.

The CMPK 230 includes a cache memory 233 for data and a memory 232 for control information. The cache memory 233 and the memory 232 for control information may be a volatile memory, for example, a Dynamic Random Access Memory (DRAM). The cache memory 233 temporarily stores (caches) data to be written to the drive 270, or temporarily stores (caches) data read from the drive 270. The memory 232 for control information stores information necessary for control (for example, configuration information of the LU 242 which is a logical volume, or a pool 245) and a storage configuration control program 231.

The MPPK 220 includes a plurality of micro-processors (MP) 221, a local memory (LM) 222, and a bus 223 that connects the MPs 221 and the LM 222. The MP 221 is a processor that is also used by a computer or the like, and operates in accordance with a program stored in the LM 222. The LM 222 stores a part of control information (configuration information and the like) for I/O control stored in the memory 232 for control information and a storage configuration control program 231.

The storage configuration control program 231 is a program that is loaded from the memory 232 for control information into the LM 222 and executed by the MP 221, and processes an operation request from the storage management computer 400. Therefore, an operation of the MPPK 220 including the storage configuration control program 231 can be described as a storage control unit.

Figure 3:
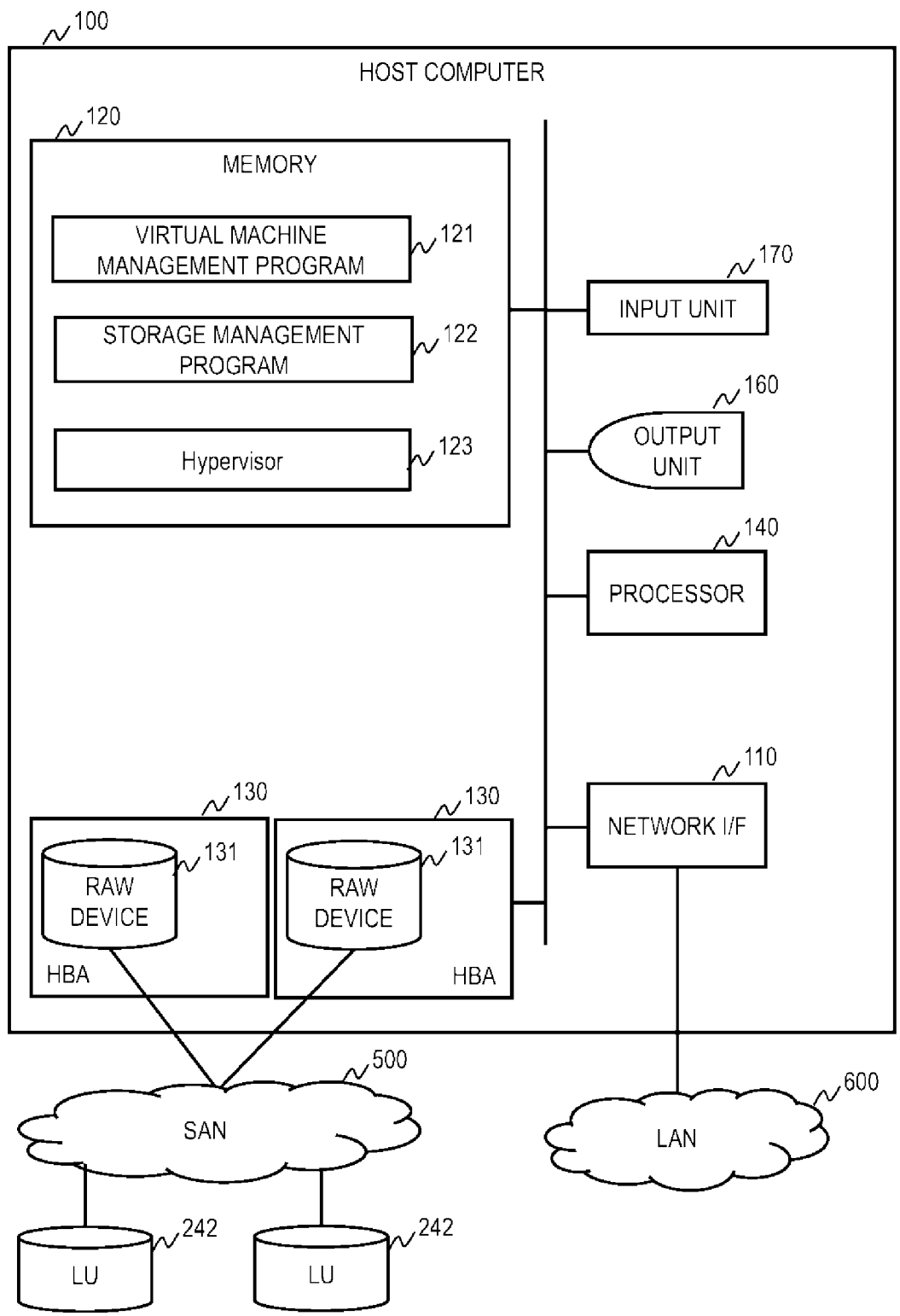
FIG. 3 shows a configuration example of a host computer.

FIG. 3 shows a configuration example of a host computer. As shown in FIG. 3, the host computer 100 is a computer including a processor 140, a memory 120, a Host Bus Adapter (HBA) 130, an output unit 160, an input unit 170, a management port 110 which is a network I/F, and the like, and is, for example, a personal computer, a workstation, or a mainframe.

The processor 140 integrally controls the overall host computer 100 and executes a virtual machine management program 121, a storage management program 122, the Hypervisor 123, and an alternate path software program (not shown), which are stored in the memory 120, to realize each function. For example, the processor 140 issues an access request such as a read access request or a write access request to the storage device 200 by executing the Hypervisor 123.

The memory 120 is used for storing programs and the like, and is also used as a work memory of the processor 140.

The HBA 130 performs protocol control during communication with the storage device 200. When the HBA 130 performs the protocol control, data and a command are transmitted and received between the host computer 100 and the storage device 200 in accordance with, for example, a fiber channel protocol.

The Hypervisor 123 includes a virtual machine control unit that deploys a virtual machine, and a disk control unit that forms a virtual disk from a RAW DEVICE.

The output unit 160 includes a monitor display, a speaker, and the like. The input unit 170 includes, for example, a keyboard, a switch, a pointing device, a microphone.

Figure 4:
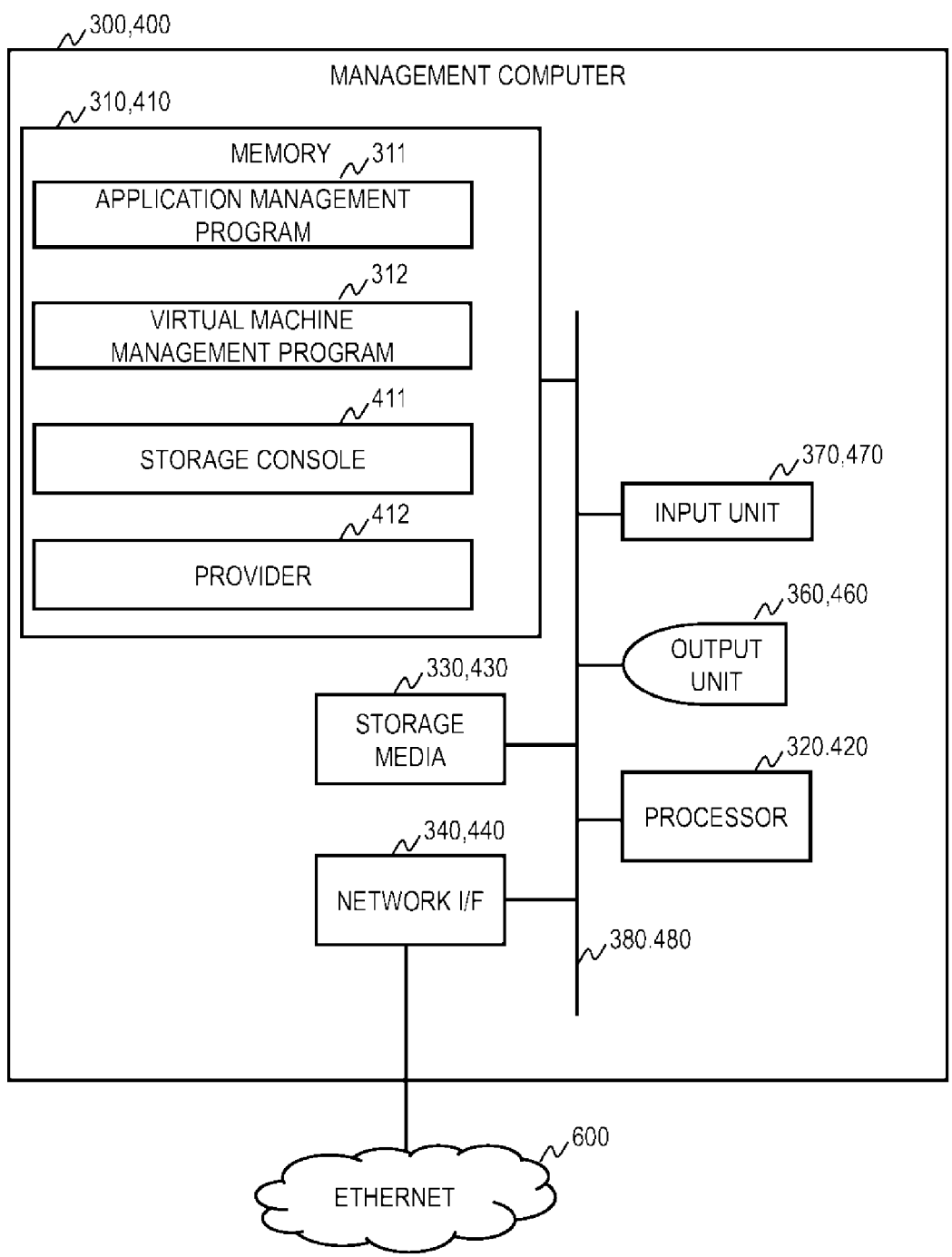
FIG. 4 shows a configuration example of various management computers.

FIG. 4 shows a configuration example of various management computers.

As shown in FIG. 4, in various management computers such as the host management computer 300 and the storage management computer 400, processors 320 and 420 integrally control the overall management computers 300 and 400. Further, the processors 320 and 420 execute management programs loaded into memories 310 and 410 to transmit configuration management operation requests of the storage device 200 and the host computer 100 to the storage device 200 and the host computer 100 via network I/Fs 340 and 440 and the management network 600.

In addition, control information used by each management program is also stored in the memories 310 and 410. An administrator can input an operation request on input units 370 and 470 such as a keyboard and a mouse, and acquire an execution result via output units 360 and 460 such as a display and a speaker. An execution log of each management program is stored in storage media 330 and 430 such as an HDD and a SSD.

FIG. 5A is a configuration example of a VM management table T100 managed by the Hypervisor 123 on the host computer 100. The VM management table T100 includes a column T101 for registering a VM identifier, a column T102 for registering an identifier of a data store that stores a VM image, and a column T103 for registering a list of VM configuration files. For example, when the VM identifier in the T101 is "VM01", the VM identifier in the T102 is "DS1", and five file paths are associated with the VM configuration file in the T103.

FIG. 5B shows an example of a storage management table T200 managed by the Hypervisor 123 on the host computer. The storage management table T200 includes a column T201 for registering an identifier of a data store or a logical volume on the host computer 100, a column T202 for registering a Type (format) of storage, and a column T203 for registering an entity of a data store or a logical volume.

Here, a format of storage in the column T202 is "EXTERNAL" when the LU provided by the storage device is used as a data store, and is expressed by "RDM" indicating Raw Device Mapping when the VM directly uses the LU provided by the storage device. Further, in the column T203, when the LU of the storage device is used as an entity of a data store or a logical volume, a set of a storage device identifier and an intra-storage device identifier "LU01" (device name. serial number) of the LU is expressed as "Storage1. LU01". For example, when the logical volume identifier in the T201 is DS1", a format of storage in the T202 is "EXTERNAL", and a storage device name "Storage1" and the intra-storage device identifier "LU01" are associated in the column T203 used for registering an entity of a data store or a logical volume.

FIG. 6A shows an example of an LU management table T300 managed by the storage device 200. The LU management table T300 is a part of the configuration information and is stored in the memory 232 for control information. Further, the LU management table T300 includes a column T301 for registering an identifier of an LU in the storage device, a column T302 for registering total capacity of the LU, a column T303 for registering an identifier of a pool to which the LU belongs, and a column T304 for registering an identifier of a target port 251 through which the LU is provided.

FIG. 6B shows an example of a pool management table T400 managed by the storage device. The pool management table T400 is a part of the configuration information and is stored in the memory 232 for control information. The pool management table T400 includes a column T401 for registering an identifier of a pool in the storage device, a column T402 for registering total capacity of the pool, a column T403 for registering free capacity of the pool, a column T404 for registering an identifier of a parity group allocated to the pool, and a column T405 that indicates whether or not a pool deduplication function is applied. The column T405 is "ON" when the deduplication function is applied, and is "OFF" when the deduplication function is not applied.

FIG. 7 shows a configuration example of a parity group management table T500 managed by the storage device 200. The parity group management table T500 is a part of the configuration information and is stored in the memory 232 for control information. Further, the parity group management table T500 includes a column T501 for registering an identifier of a parity group, a column T502 that indicates a RAID configuration of the parity group, a column T503 for registering an identifier of a physical storage medium, for example, a drive, constituting the parity group, and a column T504 for registering total logical capacity of the parity group.

FIG. 8 shows a configuration example of metadata T600a managed by the storage device. The metadata T600a is a part of the configuration information and is information that manages page allocation information of the pool. The metadata T600a is stored in the memory 232 for control information, and includes a column T601a for registering an identifier of a partial logical storage area (hereinafter referred to as page) of a specified size in the pool, a column T602a for registering a head LBA of each page in the pool, a column T603a for registering an identifier of the LU to which the page is allocated, and a column T604a for registering a head LBA in the LU that refers to the page.

In FIG. 8, Page0x01 is referenced from LU01 and LU02, which indicates that the partial logical storage area registered in T604a of each LU by the deduplication function duplicates and refers to the partial logical storage area indicated by page 0x01 in the pool. That is, when a plurality of LUs are registered in the column T603a, it indicates that the page is a page to which the deduplication function is applied.

Figure 9:
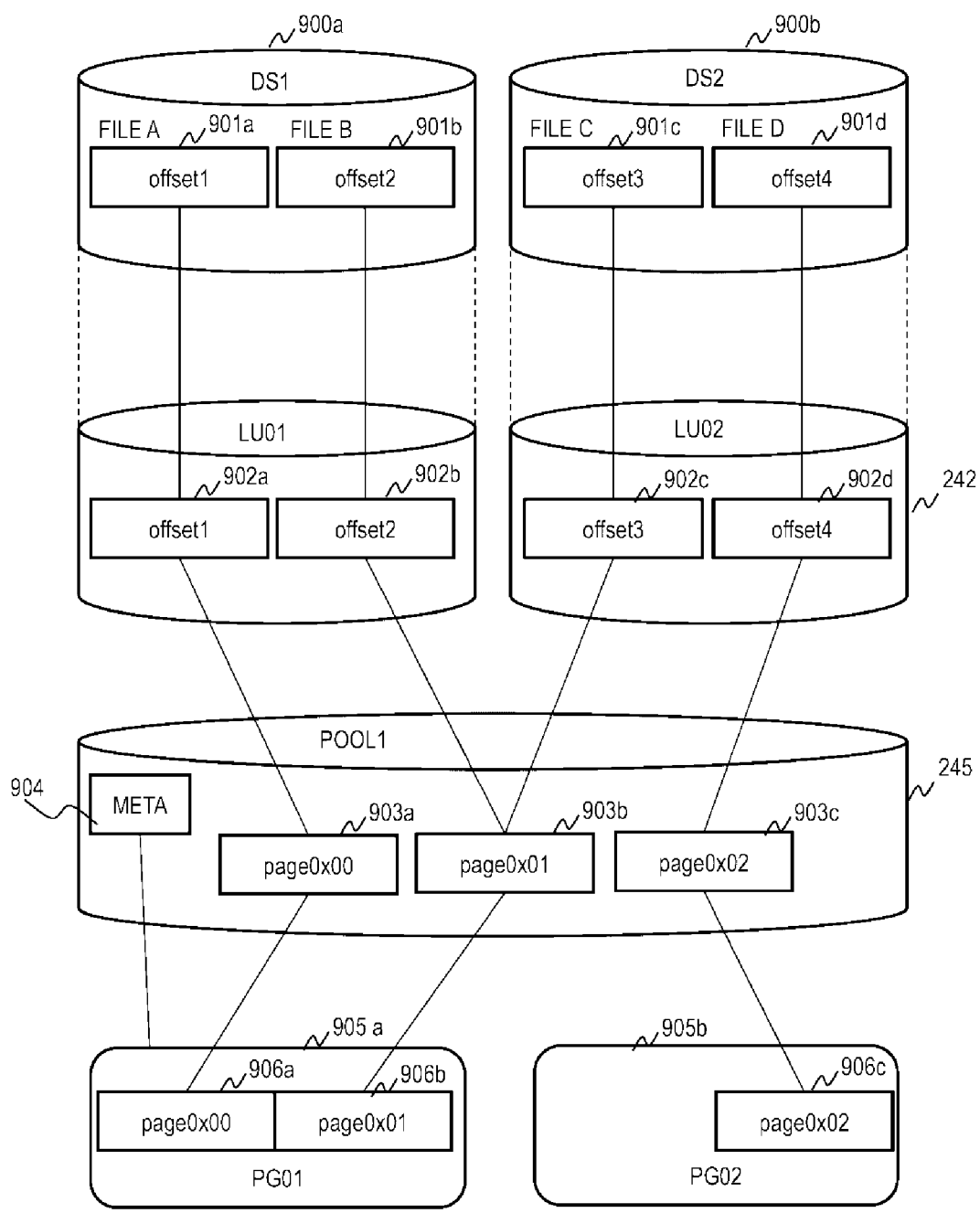
FIG. 9 shows a configuration example of a partial logical storage area on the host computer and a partial logical storage area of the storage device.

FIG. 9 shows a relationship between a partial logical storage area in a data store, which is a file system on a host computer, and a partial logical storage area in the storage device. The Hypervisor 123 on the host computer 100 stores data (FILES A, B, C and D) of a VM image or an application on the VM in a partial logical storage area (Offsets 1, 2, 3 and 4) 901 in a data store 900. An Offset includes information that indicates a head address and a length of the partial logical storage area in the data store 900.

The partial logical storage area (Offsets 1, 2, 3 and 4) in the data store 900 corresponds to a partial logical storage area 902 in the LU 242, and the partial logical storage area in the LU corresponds to a page 903 (Pages 0x00, 0x01 and 0x02) which is a partial logical storage area in the pool 245. Here, since Offsets 2 and 3 completely match data in the Offset, the Offsets 2 and 3 duplicate and refer to a Page 0x01 (903b) in the pool 245, that is, the Offsets 2 and 3 are in a state of being deduplicated. Further, metadata 904 of the pool 245 is stored in a partial logical storage area in a parity group 905a constituting the pool 245. The metadata 904 shown in FIG. 9 corresponds to the metadata T600a shown in FIG. 8.

An Offset 1 of the LU01 corresponds to a Page 0x00 (903a) of a POOL 1, and the Page 0x00 (903a) of the POOL 1 corresponds to a Page 0x00 (906a) of a parity group 01 (905a).

Figure 10:
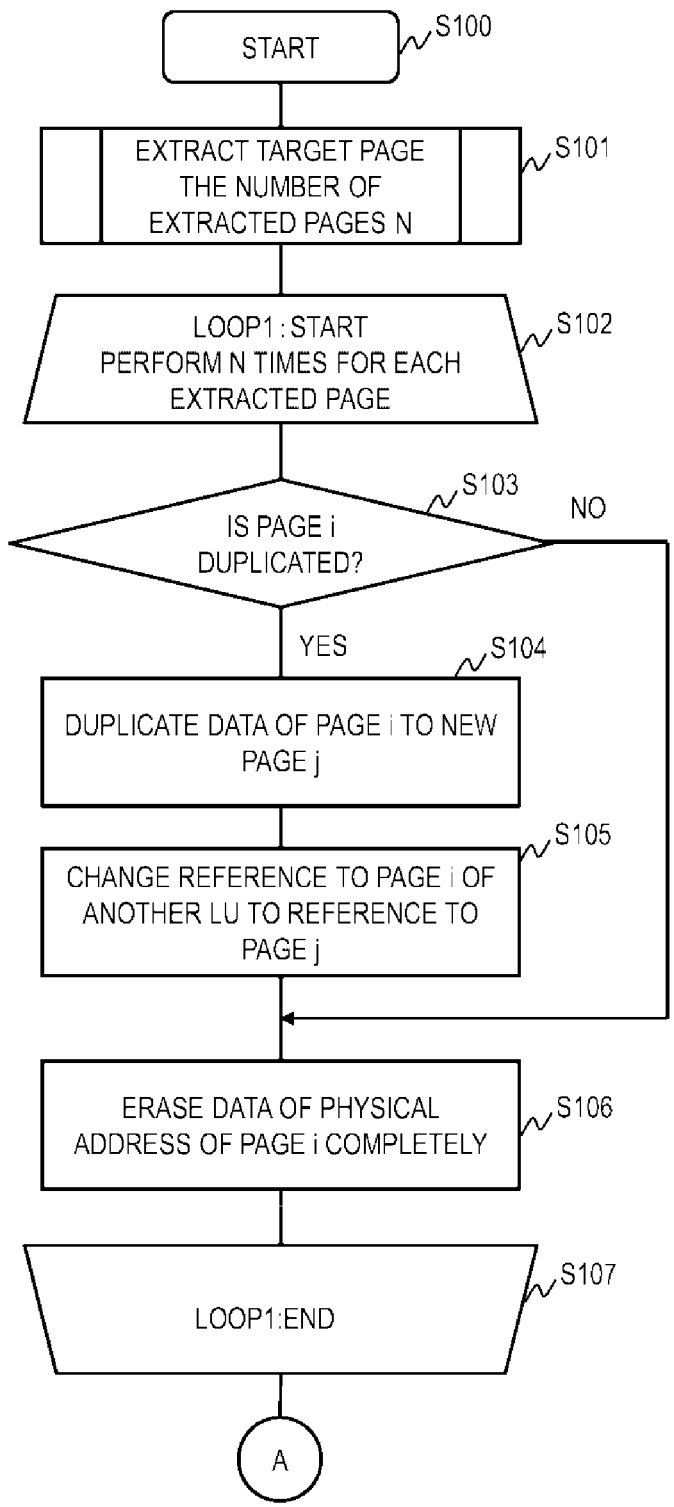
FIG. 10 shows an example of a flowchart of data erasing processing of a storage configuration control program in the first embodiment.

FIG. 10 shows an example of a flowchart of data erasing processing of the storage configuration control program 231 according to the first embodiment.

There are various triggers that start the data erasing processing of the storage configuration control program 231, and as an example thereof, a case where the Hypervisor 123 of the host computer 100 receives a VM deletion instruction from the VM administrator 10 will be described.

First, the Hypervisor 123 on the host computer 100 performs an allocation cancellation instruction for a FILE A and a FILE B used by the VM shown in FIG. 9 along with VM deletion. That is, a page allocation cancellation instruction for the Offset 1 (902a) and an Offset 2 (902b) in the LU 01 is transmitted to the storage device 200 by the SCSI UNMAP command.

The UNMAP command is a command that cancels a relationship between the Offset 1 which is a logical address in the LU 242 and a page which is a physical address in the pool 245, that is, a relationship between a logical address and a physical address. When receiving the SCSI UNMAP command, the storage configuration control program 231 of the storage device 200 loads the metadata T600a into the local memory 222, and starts data complete deletion processing shown in FIG. 10.

The storage configuration control program 231 extracts a physical page to be subjected to data erasing processing from the LU ID (target logical volume identification information) and the Offset (head LBA and the LBA number in LU of the target logical storage area), which are indicated by the SCSI UNMAP command, by referring to the column T603a and the column T604a of the metadata T600a (step S101). In this example, 0x000000 of the LU1 and 0x00002A of the LU1 correspond to each other, two pages of the Page 0x00 and the Page 0x01 are extracted, and the extracted page number N is "2".

Next, step S103 to step S107 are applied for each extracted page (step S102). Here, a processing page is referred to as a page i.

In step S103, the number of LUs registered in the column T603a corresponding to the page i is confirmed with reference to the metadata T600a. When the number of LUs is 2 or more, it is determined that the page is a duplicate application page and the process proceeds to step S104. When the number of LUs is 1, the process proceeds to step S106.

In step S104, data of the page i is duplicated to a new page j, which is a free logical area in the pool. The new page j uses a page that is not allocated to the LU 242 in the pool 245.

In step S105, reference to the page i of another LU is changed to reference to the page j. That is, when the LU that stores the FILE A and the FILE B to be deleted is the LU 01, the page ID (T601a) of the LU 02 and the LBA (T602a) in the pool 245 are changed to a POOL LBA and a Page ID of the new page j.

In step S106, random data is overwritten a specified number of times in the logical storage area corresponding to the page i to make the data irreversible, that is, the data corresponding to the physical address is completely erased.

Processing from step S103 to step S107 are applied to all the extracted pages.

Figure 11:
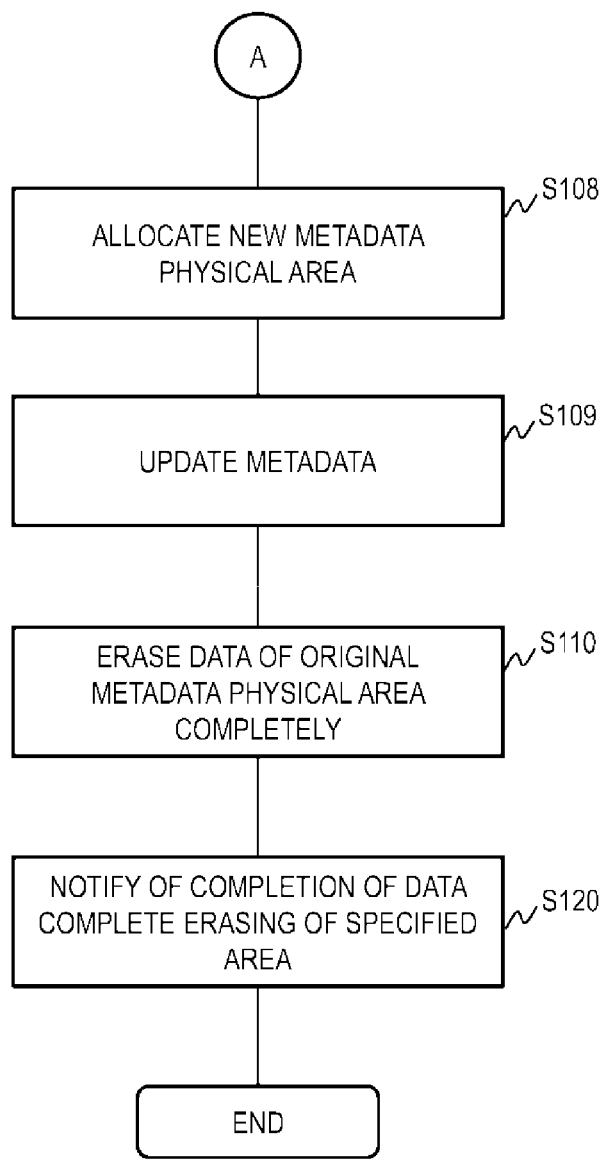
FIG. 11 shows the example of the flowchart of the data erasing processing of the storage configuration control program in the first embodiment.

FIG. 11 is the flowchart of the data erasing processing of the storage configuration control program 231 according to the first embodiment, and shows a continuation of FIG. 10. After the processing from step S103 to step S107 is applied to all the extracted pages, step S108 shown in FIG. 11 is performed.

In step S108, a new physical storage area used for writing the metadata 904 representing a state after the data erasing is allocated. In step S109, the corresponding page allocation of the specified LU is canceled. In this example, registration of the column T603a and the column T604a of the Pages 0x00 and 0x01 of the LU01 is made blank. The state is shown in FIG. 13.

Here, a completion response of the UNMAP command is sent to the Hypervisor 123. With the completion response, the Hypervisor 123 recognizes that the metadata in the storage device 200 is in the state shown in FIG. 13. The completion response of the UNMAP command is stored in a FILE STATUST 1040 of a virtual machine management table shown in FIG. 17.

Next, the metadata is written to the new physical storage area allocated in step S109, and in step S110, the data in an original metadata physical area is made irreversible. That is, in order to erase the data completely, random data is overwritten a specified number of times on the physical storage area where the metadata is read at the start of processing, and data on the area (the physical address) is made irreversible. In step S120, the host management computer 300, which is an instruction source, is notified of completion of the data complete erasing of the specified logical area via the management network 600. When receiving this notification, the host management computer 300 stores and manages the notification in a SHERED STATUS column T1050 of the virtual machine management table shown in FIG. 17. Accordingly, the VM administrator 10 or the application administrator 20 of the host management computer 300 can recognize that the data is completely erased from the storage device 200.

Although FIG. 10 and FIG. 11 show an example in which the storage configuration control program 231 performs data erasing processing triggered by VM deletion, the data erasing processing of the storage configuration control program 231 is also performed when a FILE is deleted in the host computer 100 in addition to the VM deletion.

Figure 12:
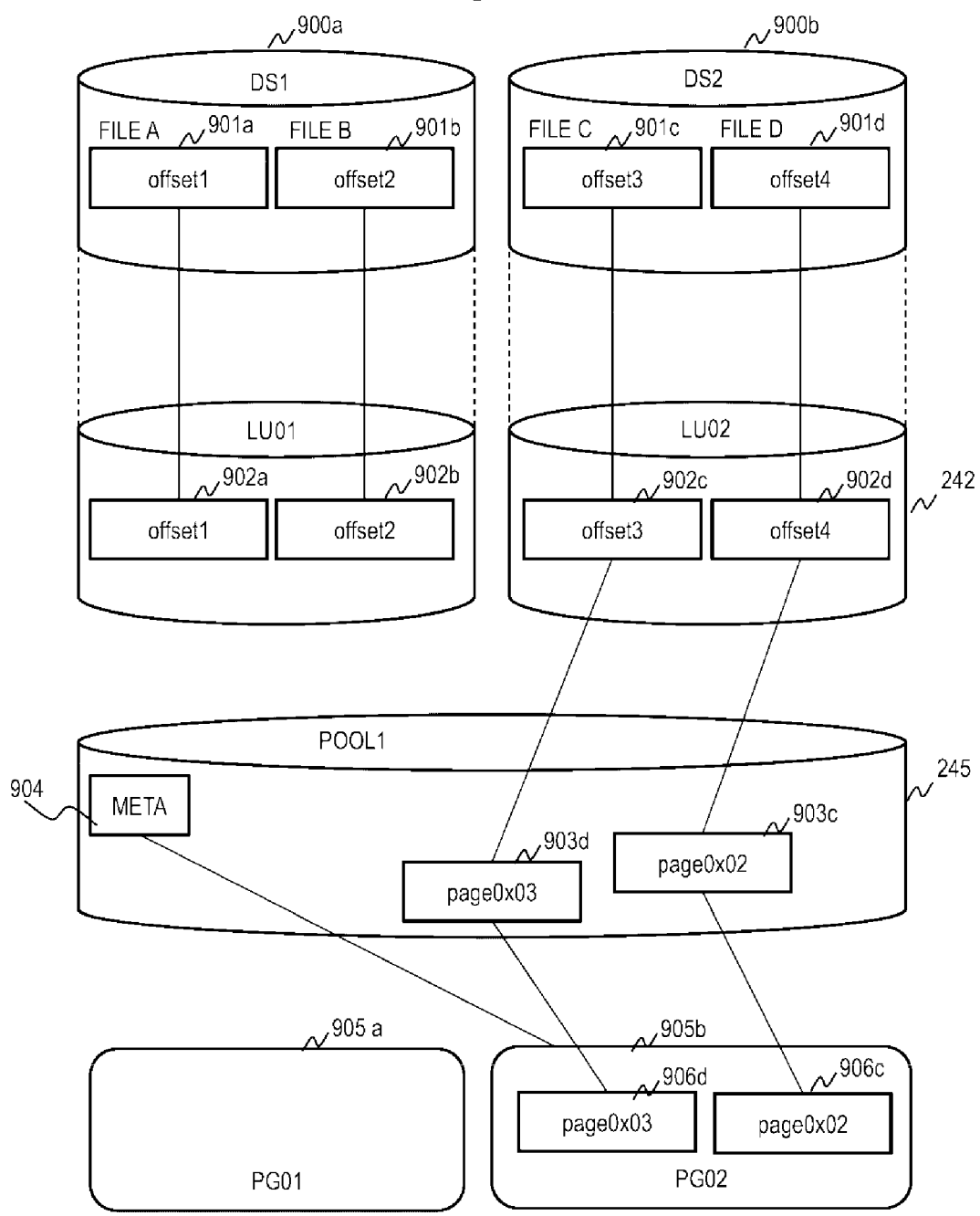
FIG. 12 shows a configuration example of a partial logical storage area after the data erasing processing of the storage configuration control program.

FIG. 12 shows a configuration example of a partial logical storage area after the data erasing processing of the storage configuration control program. That is, FIG. 12 shows a state after the FILE A and the FILE B are deleted from the state shown in FIG. 9 and the technology of the present disclosure is applied.

A logical storage area corresponding to the Offsets 1 and 2 is not present in the pool 245, and the Page 0x01 to which the deduplication function is applied is data-duplicated to the Page 0x03 (903d), and allocation to the Offset 3 (902c) is changed from the Page 0x01 to the Page 0x03. Further, the metadata is also changed from an area of PG 001 (905a) to a physical storage area of PG 002 (905b).

According to the storage configuration control program 231 of the first embodiment, data in the physical storage area where data was stored is completely erased. Further, for a page that is subjected to deduplication, data is transferred to another page to be associated with a file that is not erased, and a decrease in a deduplication rate can be prevented. In addition, a history of the metadata can be traced, and the information that restores erasing data from the physical storage medium provided in the storage device can be completely deleted.

In the description of the first embodiment, data being completely erased means an irreversible state in which data stored in a drive such as an HDD or SSD cannot be read in an original state.

Second Embodiment

In a second embodiment, the storage device 200 includes a Software-defined Storage (SDS) configuration. The SDS configuration is a configuration in which storage software runs on a VM in a hypervisor on a computer (hereinafter, referred to as a node). Therefore, a main difference from the first embodiment is that the drive 270, which is a physical storage medium used by a storage device, is a virtual disk provided by the Hypervisor of the node.

Figure 14:
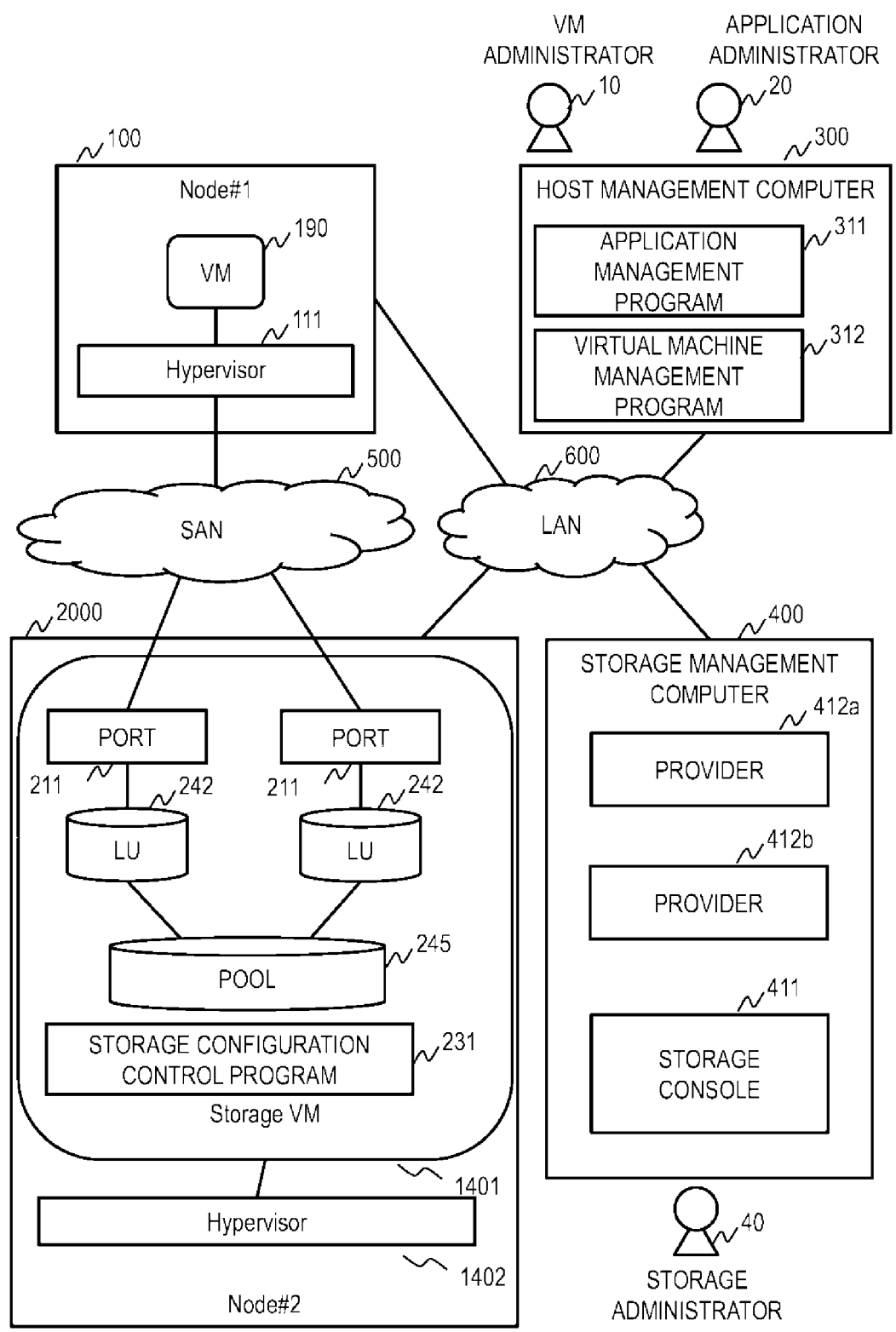
FIG. 14 shows an overall configuration example of a system according to a second embodiment.

FIG. 14 shows an overall configuration example of a system according to the second embodiment. The main difference from the first embodiment is that the storage device runs on a storage VM 1401 provided by the Hypervisor on the node, the physical storage medium used by a storage system 2000 is a virtual disk, and the host computer 100 is constituted by a node 1. Therefore, the host computer 100 is a compute node and can be simply referred to as a computer. Although the node that constitutes the storage system 2000 is shown as one node in FIG. 14, the storage system may be constituted by a plurality of nodes.

Since the LU 242, the pool 245, a parity group, and metadata, which are provided in the storage system 2000 are the same in configuration as those in the first embodiment, the description thereof is omitted.

Figure 15:
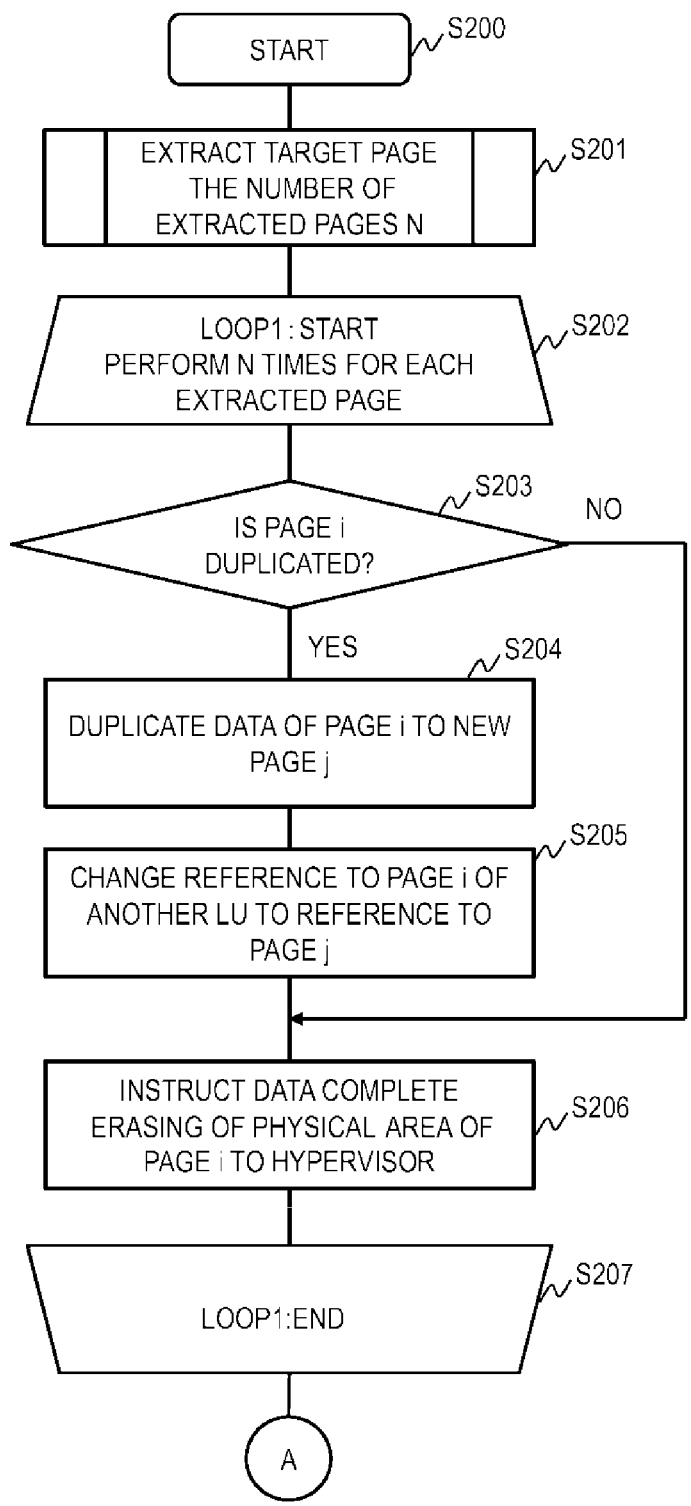
FIG. 15 shows an example of a flowchart of access control to an existing resource by the storage configuration control program.
Figure 16:
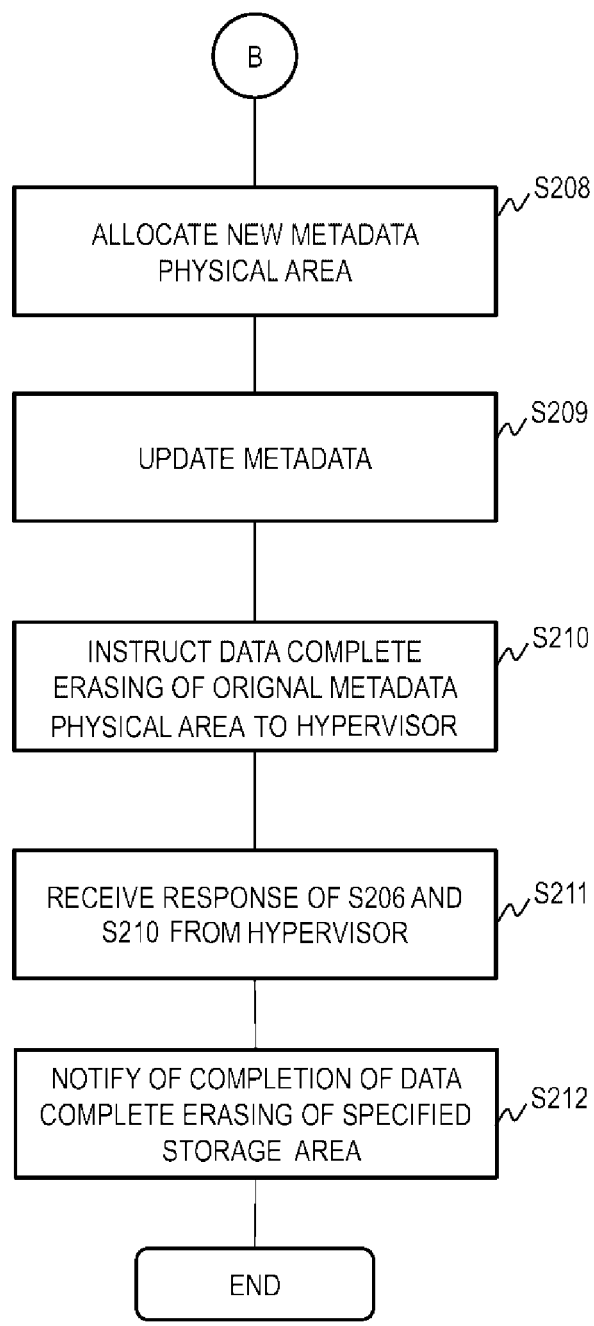
FIG. 16 shows the example of the flowchart of the access control to the existing resource by the storage configuration control program.

FIGS. 15 and 16 show a flowchart of data complete erasing processing performed by the storage configuration control program 231 according to the second embodiment.

A difference from the data complete erasing processing (FIGS. 10 and 11) according to the first embodiment is that the data complete erasing processing (step S106 and step S110) of the physical storage area that stores an allocation cancellation target page and metadata is instructed to a Hypervisor 1402 that provides a VM on which the storage system 2000 runs, and the area is completely overwritten with random data (steps S206 and S210) when the Hypervisor 1402 does not support the logical area specification data complete erasing processing.

User data cannot be restored from the physical storage medium on the node including the VM on which the storage system 2000 runs, by the storage configuration control program 231 shown in FIGS. 15 and 16. In addition, the user data can be completely erased without using a resource of the host computer 100.

Figure 17:
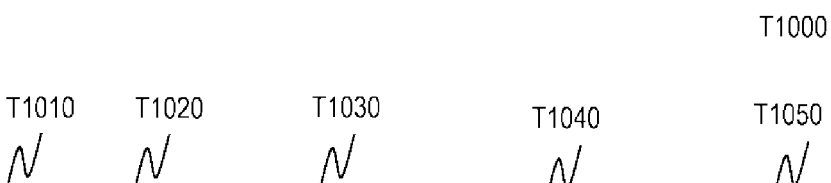
FIG. 17 shows an example of a virtual machine management table contained in a host management computer.

FIG. 17 is a virtual machine management table T1000 provided in a host management computer. Similar to FIG. 5A, the VM management table T1000 includes a column T1010 for registering a VM identifier, a column T1020 for registering an identifier of a data store that stores a VM image, and a column T1030 for registering a list of VM configuration files. For example, when the VM identifier in the T1010 is "VM01", the VM identifier in the T1020 is "DS1", and five file paths are associated with the VM configuration file in the T1030. The virtual machine management table T1000 includes a column T1040 for registering a state transition by response of a SCSI UNMAP command, and a column T1050 for registering a state transition by notification of data erasing completion via a storage console and/or a provider.

The column T1040 for registering a state transition by response of a SCSI UNMAP command is changed to a deleted status from a normal status when the SCSI UNMAP command of an address (LBA) indicating a data storage location of a target file is transmitted to the storage device that holds an LU forming a DS and the response is received.

In the column T1050 for registering a state transition by notification of data erasing completion via a storage console and/or a provider, when the storage device 200 receives a SCSI UNMAP command and executes stored data erasing processing of the invention, the storage device 200 notifies a storage console 411 and a provider 412 of the LU number, an LBA offset, and a data erasing state, and the virtual machine management program 312 receives the notification to transit a status. In the table, "SHRED" represents a state in which erasing processing of the data stored in the drive normally ends, and a date and time of destruction processing completion is described. "SHREDDING" indicates that data destruction processing is being performed.

Further, for the page that is subjected to the deduplication, since data is transferred to another page to be associated with a file that is not erased, a decrease in a deduplication rate can be prevented.

In addition, a history of the metadata can be traced, and the information for restoring data erased from the physical storage medium provided in the storage device can be completely deleted.

In the description of the second embodiment, data being completely erased means an irreversible state in which data stored in a drive such as an HDD or SSD cannot be read in an original state.

What is claimed is:

1. A storage device connected to a computer, wherein in response to data deletion on the computer, the storage device is configured to receive an UNMAP command from the computer to cancel a relationship between a logical address and a physical address provided to the computer, the storage device comprising:
    a control unit configured to:
    determine whether data stored at a first physical address is allocated to at least two logical volumes in a plurality of logical volumes, wherein the first physical address is specified by the UNMAP command;
    duplicate the data stored at the first physical address to a second physical address when it is determined that the data stored at the first physical address is allocated at least two logical volumes in the plurality of logical volumes;
    overwrite data stored at the first physical address with random data a specified number of times, wherein this overwriting causes the data stored at the first physical address to become irreversible and thereby completely erased;
    allocate the second physical address to which the data from the first physical address was duplicated to a logical volume other than a first logical volume specified by the UNMAP command.

2. The storage device according to claim 1, wherein the control unit has a thin provisioning function, and is configured to manage metadata in which a head address of a page in a pool, a logical volume to which the page is allocated, and a head address in the logical volume are associated with each of a plurality of pages of a specified size that constitute a pool of the thin provisioning function.

3. The storage device according to claim 2, wherein the control unit is configured to make the metadata related to the first physical address irreversible, wherein the first physical address is specified by the UNMAP command.

4. The storage device according to claim 2, wherein the control unit is configured to extract a page to be subjected to data erasing processing based on the metadata from target logical volume identification information that specifies a logical volume and a head address and the number of pages in the target logical volume, the target logical volume identification information, the head address and the number of pages being contained in the UNMAP command.

5. The storage device according to claim 1, wherein the control unit is configured to notify the computer that the data stored in the first physical address is in an irreversible state, wherein the first physical address is specified by the UNMAP command.

6. The storage device according to claim 1, wherein the storage device is provided on a hypervisor on a node.

7. A storage device connected to a computer, wherein in response to data deletion on the computer, the storage device is configured to receive an UNMAP command from the computer to cancel a relationship between a logical address and a physical address provided to the computer, the storage device comprising:
    a control unit configured to:
    determine whether data stored in a first physical page is allocated to at least two logical volumes of a plurality of logical volumes, wherein the first physical page is specified by the UNMAP command;
    duplicate the data stored in the first physical page to a second physical page when the data stored in the first physical page is allocated to at least two logical volumes of the plurality of logical volumes;
    overwrite data stored in the first physical page with random data a specified number of times, wherein this overwriting causes the data stored in the first physical page to become irreversible and thereby completely erased; and
    allocate the second physical page to which the data is duplicated to a second logical volume other than a first logical volume specified by the UNMAP command.

8. The storage device according to claim 7, wherein the control unit has a thin provisioning function, and is configured to manage metadata in which a head address of a page in a pool, a logical volume to which the page is allocated, and a head address in the logical volume are associated with each of a plurality of pages of a specified size that constitute a pool of the thin provisioning function.

9. The storage device according to claim 7, wherein the control unit is configured to make metadata related to the first physical page irreversible, wherein the first physical page is specified by the UNMAP command.

10. The storage device according to claim 8, wherein the control unit is configured to extract a page to be subjected to data erasing processing based on the metadata from target logical volume identification information that specifies a logical volume and a head address and the number of pages in the target logical volume, the target logical volume identification information, the head address and the number of pages being contained in the UNMAP command.

11. The storage device according to claim 7, wherein the control unit is configured to notify the computer that the data stored in the physical the first physical is in an irreversible state, wherein the first physical page is specified by the UNMAP command.

12. The storage device according to claim 7, wherein the storage device is provided on a hypervisor on a node.

13. A method for erasing data of a storage device connected to a computer, the method comprising:
    transmitting, via the computer, an UNMAP command to cancel a relationship between a logical address and a physical address provided to the computer in response to data deletion on the computer; and
    configuring the storage device to:
    receive the UNMAP command to cancel the relationship between the logical address and the physical address provided to the computer,
    determine whether data stored at a first physical address is allocated to at least two logical volumes of the plurality of logical volumes, wherein the first physical address is specified by the UNMAP command, duplicate the data stored at the first physical address to a second physical address when it is determined that the data stored at the first physical address is allocated at least two logical volumes in the plurality of logical volumes, overwrite data stored at the first physical address with random data a specified number of times, wherein this overwriting causes the data stored at the first physical address to become irreversible and thereby completely erased, and allocate the second physical address to which the data from the first physical address was duplicated to a logical volume other than a first logical volume specified by the UNMAP command.

14. The method for erasing data of a storage device according to claim 13, wherein the storage device is configured to extract a page to be subjected to data erasing processing based on metadata that manages correspondence between a logical address and a physical address from target logical volume identification information that specifies a logical volume and a head address and the number of pages in the target logical volume, the target logical volume identification information, the head address and the number of pages being contained in the UNMAP command.

15. A method for erasing data of a storage device connected to a computer, the method comprising:

transmitting, via the computer, an UNMAP command to cancel a relationship between a logical address and a physical address provided to the computer in response to data deletion on the computer; and configuring the storage device to:

receive the UNMAP command to cancel the relationship between the logical address and the physical address provided to the computer, determine whether data stored in a first physical page is allocated to at least two logical volumes of a plurality of logical volumes, wherein the first physical page is specified by the UNMAP command, duplicate the data stored in the first physical page to a second physical page when the data stored in the first physical page is allocated to at least two logical volumes of the plurality of logical volumes, overwrite data stored in the first physical page with random data a specified number of times, wherein this overwriting causes the data stored in the first physical page to become irreversible and thereby completely erased, and allocate the second physical page to which the data is duplicate to a second logical volume other than a first logical volume specified by the UNMAP command.

* * * * *